United States Patent
Gómez García et al.

(10) Patent No.: US 12,188,904 B2
(45) Date of Patent: Jan. 7, 2025

(54) SYSTEM AND METHOD FOR ESTIMATING BOTH THICKNESS AND WEAR STATE OF REFRACTORY MATERIAL OF A METALLURGICAL FURNACE

(71) Applicant: ArcelorMittal, Luxembourg (LU)

(72) Inventors: Pablo Gómez García, Santander Asturias (ES); José Paulino Fernandez Alvarez, Mieres del Camino Asturias (ES); Ignacio Baquet González, Aviles Asturias (ES); José Tomás Símaro, Aviles (ES); Ignacio Herrero Blanco, Gijon Asturias (ES); Enol Fernández Diéguez, Mieres Asturias (ES); Carlos Javier Suárez Lázare, Turon Asturias (ES)

(73) Assignee: ArcelorMittal, Luxembourg (LU)

( * ) Notice: Subject to any disclaimer, the term of this patent is extended or adjusted under 35 U.S.C. 154(b) by 208 days.

(21) Appl. No.: 17/779,033

(22) PCT Filed: Nov. 27, 2020

(86) PCT No.: PCT/IB2020/061212
§ 371 (c)(1),
(2) Date: May 23, 2022

(87) PCT Pub. No.: WO2021/105940
PCT Pub. Date: Jun. 3, 2021

(65) Prior Publication Data
US 2022/0404316 A1    Dec. 22, 2022

(30) Foreign Application Priority Data

Nov. 29, 2019   (WO) .................. PCT/IB2019/060326

(51) Int. Cl.
*G01N 29/04*   (2006.01)
*C21B 7/24*   (2006.01)
(Continued)

(52) U.S. Cl.
CPC ............. *G01N 29/045* (2013.01); *C21B 7/24* (2013.01); *C21C 5/44* (2013.01); *F27D 21/0021* (2013.01);
(Continued)

(58) Field of Classification Search
CPC .. G01N 29/045; G01N 29/12; G01N 29/4427; G01N 29/4436; G01N 29/4472;
(Continued)

(56) References Cited

U.S. PATENT DOCUMENTS

| | | |
|---|---|---|
| 5,101,162 A | 3/1992 | Webster |
| 7,174,787 B2 | 2/2007 | Sadri et al. |

(Continued)

FOREIGN PATENT DOCUMENTS

| | | |
|---|---|---|
| CN | 106850296 A | 6/2017 |
| EP | 1893972 | 3/2008 |

(Continued)

OTHER PUBLICATIONS

Search Report of PCT/IB2020/061212 dated Feb. 24, 2021.
(Continued)

*Primary Examiner* — Benjamin R Schmitt
(74) *Attorney, Agent, or Firm* — Davidson Kappel LLC (57) ABSTRACT

A system for estimating both thickness and wear state of refractory material of a metallurgical furnace, including at least one processor including a database of simulated frequency domain data named simulated spectra representing simulated shock waves reflected in simulated refractory materials of known state and thickness, each simulated spectrum being correlated with both known state and thick- (Continued)

ness data of the considered simulated refractory material, wherein the at least one processor is configured to record a reflected shock wave as a time domain signal, and to convert it into frequency domain data named experimental spectrum, and are further configured to compare the experimental spectrum with at least a plurality of simulated spectra from the database, to determine the best fitting simulated spectrum with the experimental spectrum and to estimate thickness and state of the refractory material of the furnace using known state and thickness data correlated with the best fitting simulated spectrum.

14 Claims, 4 Drawing Sheets (51) Int. Cl.
    *C21C 5/44*     (2006.01)
    *F27D 21/00*     (2006.01)
    *G01B 17/02*     (2006.01)
    *G01M 5/00*     (2006.01)
    *G01M 7/08*     (2006.01)
    *G01N 29/12*     (2006.01)
    *G01N 29/44*     (2006.01)
    *G01N 29/46*     (2006.01)

(52) U.S. Cl.
CPC .......... *G01B 17/02* (2013.01); *G01M 5/0033* (2013.01); *G01M 5/0066* (2013.01); *G01M 7/08* (2013.01); *G01N 29/12* (2013.01); *G01N 29/4427* (2013.01); *G01N 29/4436* (2013.01); *G01N 29/4472* (2013.01); *G01N 29/46* (2013.01); *C21C 2005/448* (2013.01); *G01N 2291/0234* (2013.01); *G01N 2291/0258* (2013.01); *G01N 2291/02854* (2013.01)

(58) Field of Classification Search
CPC .......... G01N 29/46; G01N 2291/0234; G01N 2291/0258; G01N 2291/02854; G01M 5/0033; G01M 5/0066; G01M 7/08; C21C 5/44; C21C 2005/448; C21B 7/24; F27D 21/0021; G01B 17/02
See application file for complete search history.

(56) References Cited

U.S. PATENT DOCUMENTS

| | | | |
|---|---|---|---|
| 7,665,362 B2 | 2/2010 | Sadri et al. | |
| 2003/0145659 A1 | 8/2003 | Momayez et al. | |
| 2004/0134280 A1 | 7/2004 | Hedberg et al. | |
| 2004/0177692 A1 | 9/2004 | Sadri et al. | |
| 2006/0186585 A1 | 8/2006 | Sadri et al. | |
| 2008/0060412 A1 | 3/2008 | Palmer et al. | |
| 2016/0084802 A1 | 3/2016 | Yusuf et al. | |
| 2018/0347907 A1* | 12/2018 | Lammer | C21C 5/445 |
| 2019/0017895 A1* | 1/2019 | Tsai | G01M 5/0025 |

FOREIGN PATENT DOCUMENTS

| | | |
|---|---|---|
| JP | S63-295909 | 12/1988 |
| JP | H 08219751 A | 8/1996 |
| JP | H10219323 A | 8/1998 |
| JP | 2001294918 A | 10/2001 |
| JP | 2016166781 A | 9/2016 |
| KR | 20180065566 | 6/2018 |
| KR | 20180130771 | 12/2018 |
| WO | WO2013017880 A1 | 2/2013 |
| WO | WO2018089044 A1 | 5/2018 |
| WO | WO2018184089 A1 | 10/2018 |
| WO | WO 2019186256 A1 | 10/2019 |

OTHER PUBLICATIONS

Written Opinion of PCT/IB2020/061212.
Sadri A et al, "A Comprehensive Review of Acousto Ultrasonic-Echo (AU-E) Technique for Furnace Refractory Lining Assessment", Internet Citation, (Aug. 23, 2015), URL: https://docplayer.net/101115406-A-comprehensive-review-of-acousto-ultrasonic-echo-au-e-technique-for-furnace-refractory-lining-assessment.html, (Nov. 16, 2018).
V K Kachanov et al, "Ultrasonic wave velocity measurement in concrete using the impact-echo method", INSIGHT—Non-Destructive Testing and Condition Monitoring, GB, (Jan. 1, 2019), vol. 61, No. 1, doi:10.1784/insi.2019.61.1.15, ISSN 1354-2575, pp. 15-19.
Schubert et al., *Geometrical Effects on Impact-Echo Testing of Finite Concrete Specimens*, International Symposium Non-Destructive Testing in Civil Engineering 2003.
Sadri, *Application of impact-echo technique in diagnoses and repair of stone masonry structures*, NDT&E International 36 (2003) 195-202.
Chomyn et al.: "Blast Furnace Hearth Assessment by Combining AU-E and Thermocouple Data", ECIC 2016, 7th European Coke and ironmaking Congress, Sep. 12, 2016-Sep. 14, 2016.
Chomyn et al.: " Blast Furnace Thermal Assessment and Identification of Wear Zones," AISTech 2017 Proceedings, May 8 to 11, 2017.
Chomyn et al.: "Refractory Condition Assessment in Blast Furnace Hearth by Utilizing NDT, Thermocouple and Cooling System Data," UNITECR 2017, downloaded on Apr. 9, 2021 from http://www.unitecr2017.mundodecongresos.com/abstracts/Paper_rbxhbhfxcsxxphjpofsam.pdf.
Ghorbani et al.: "Thermal Assessment and Identification of Wear Zones in Blast Furnace Tapholes." Furnace Tapping 2018 Conference, Southern African Institute of Mining and Metallurgy, Kruger National Park, Oct. 14-17, 2018.
Hung et al.: "Predictions of Blast Furnace Hearth Corner Erosion Profile," Iron & Steel Technology, Mar. 2009, AISTech 2009, May 4 to 7, 2009.
Silva Magnago et al.: "Comparison of Methods for Solving Inverse Problems to Estimate the Wear Line in a Blast Furnace Hearth", 10th World Conference on Computational Mechanics 2012, Jul. 2012.
Shim, B., Min, H. & Yoon, S. Nonlinear preprocessing method for detecting peaks from gas chromatograms. BMC Bioinformatics 10, 378 (2009). https://doi.org/10.1186/1471-2105-10-378.
L. Domokos, D. Hennberg, B. Weimann, Computer-aided identification of compounds by comparison of mass spectra, Analytica Chimica Acta, vol. 165, 1984, pp. 61-74, ISSN 0003-2670, https://doi.org/10.1016/S0003-2670(00)85186-7.
Pradhan, Tripti, "Finite Element Modeling of Impact-Generated Stress Wave Propagation in Concrete Plates for Non-Destructive Evaluation" (2015). Theses and Dissertations. Paper 1597.
Carino, "Impact Echo: The Fundamentals," International Symposium Non-Destructive Testing in Civil Engineering (NTD-CE), Sep. 15-17, 2015 Berlin, Germany.
Carino, Nicholas. (2001). The Impact-Echo Method: An Overview1. 10.1061/40558(2001)15.
Gomez," Reflections on the Spectral Peaks in an Impact-Echo Test by Guided Waves Arguments." International Symposium Non-Destructive Testing in Civil Engineering (NTD-CE), Sep. 15-17, 2015 Berlin, Germany.

* cited by examiner

SYSTEM AND METHOD FOR ESTIMATING BOTH THICKNESS AND WEAR STATE OF REFRACTORY MATERIAL OF A METALLURGICAL FURNACE

TECHNICAL FIELD

The invention falls within the field of metallurgy and, more particularly, within the field of refractory materials inside metallurgical furnaces.

The invention relates to a system and a method for estimating both thickness and wear state of refractory material of a metallurgical furnace, like for instance a blast furnace.

BACKGROUND

A blast furnace typically comprises a metal-plate outer layer, preferentially a steel plate outer layer, an inner layer and an intermediate ramming layer both made of a refractory material. This refractory material allows good thermal isolation of the outer layer and forms the refractory wall of the blast furnace.

However, since the blast furnace may be subjected to very high temperatures—over 1500 degrees Celsius, and since molten metals are produced by chemical reactions involving more than 1000 gases and materials, the refractory material is submitted to high chemical and thermal stress, resulting in its progressive deterioration and thickness reduction. Thus, if the refractory material goes down a critical thickness, this may cause a major dysfunction of the blast furnace, often leading to serious accidents.

Non-destructive inspection techniques are already known to estimate the thickness of refractory material of a blast furnace, known as the impact echo method.

However, those known techniques are not accurate enough, and nor do they estimate thickness nor wear state of multi-layered materials like the refractory material of a blast furnace. For example, when submitted to high chemical and thermal stress, a weakened layer may appear within the refractory material, especially when it is made of carbon. Impact echo techniques are not accurate enough to precisely determine the position and the thickness of such weakened layer, often named brittle layer. Moreover, impact echo techniques cannot detect ramming gaps in the ramming layer.

SUMMARY OF THE INVENTION

It is an object of the present invention to remedy the drawbacks of the prior art by providing a system and a non-destructive method for estimating both thickness and wear state of a refractory material of a blast furnace.

SUMMARY OF THE INVENTION

The present invention provides a system for estimating both thickness and wear state of a refractory material (1) of a metallurgical furnace, comprising at least:
- shock wave generation means configured to generate at least one shock wave that propagates into the refractory material,
- a shock wave sensor configured to sense at least one reflected shock wave into the refractory material,
- processing means comprising a database of simulated frequency domain data named simulated spectra representing simulated shock waves reflected in simulated refractory materials of known state and thickness, each simulated spectrum being correlated with both known state and thickness data of the considered simulated refractory material, wherein the processing means are configured:
  - to record the reflected shock wave as a time domain signal, and to convert it into frequency domain data named experimental spectrum, and
  - to compare the experimental spectrum with a plurality of simulated spectra from the database, to determine the best fitting simulated spectrum with the experimental spectrum and to estimate thickness and state of the refractory material of the furnace using known state and thickness data correlated with the best fitting simulated spectrum The system may also have the optional features listed below considered individually or in combination:
The processing means are configured to sequentially:
  i. Determine resonant frequency peaks position in the frequency domain data;
  ii. Filter the simulated spectra from the database with the resonant frequency peaks, and select a reduced corresponding group of simulated spectra comprising said resonant frequency peaks, and
  iii. Determine a unique simulated spectrum from the reduced corresponding group, whose resonant frequency peaks are the closest in height to those of the experimental spectrum, said unique simulated spectrum being the best fitting simulated spectrum.

The shock wave generation means comprise an instrumented hammer configured to hit the metallurgical furnace wall in order to generate at least an acoustic shock wave propagating and reflecting into the refractory material.

The shock wave sensor comprises at least an accelerometer configured to measure the mechanical reaction of the refractory material caused by the reflection of the generated shock wave.

The present invention also provides a method for estimating both thickness and wear state of a refractory material of a metallurgical furnace with a system as described above, said method comprising at least the following steps:
  i. Generating at least a shock wave that propagates into the refractory material;
  ii. Sensing at least a reflected shock wave into the refractory material;
  iii. Recording the reflected shock wave as a time domain signal;
  iv. Converting said time domain signal into frequency domain data called experimental spectrum;
  v. Comparing the experimental spectrum with at least a plurality of simulated spectra from the database, each simulated spectrum being correlated with both known state and thickness data of the considered refractory material;
  vi. Determining the best fitting simulated spectrum with the experimental spectrum, and
  vii. Estimating thickness and state of the refractory material of the furnace using known state and thickness data correlated with the best fitting simulated spectrum.

The method may also have the optional features listed below considered individually or in combination:
Steps v and vi are implemented by sequentially:
  a. Determining resonant frequency peaks position in the experimental spectrum;
  b. Filtering the simulated spectra from the database with the resonant frequency peaks detected, and selecting a reduced corresponding group of simulated spectra comprising said resonant frequency peaks, and c. Determining a unique simulated spectrum from the reduced corresponding group, whose resonant frequency peaks are the closest in height to those of the experimental spectrum, said unique spectrum being the best fitting simulated spectrum Step vii is implemented by at least estimating the total thickness of the refractory material and the position and thickness of at least a layer in which the refractory is weakened by anomalies, said layer being named brittle layer.

A plurality of shock waves are generated, a plurality of reflected shock waves are sensed and recorded as time domain signals, and into frequency domain signals.

The determination of resonant frequency peaks position in the experimental spectrum is implemented following the steps of:

a. arithmetically averaging the experimental spectra and selecting a first set of representative peaks;

b. geometrically averaging the experimental spectra and selecting a second set of representative peaks, and c. Selecting a final set of peaks that were both selected in the first set and the second set, said final set of peaks being the resonant frequency peaks.

Peaks of the first set are selected if their width is greater than a threshold value comprised between ten and twenty hertz.

The simulated spectra from the database are filtered with the resonant frequency peaks detected using at least a numerical dispersion curves model in order to determine propagation modes of the simulated shock waves, to filter them with the resonant frequency peaks detected, and to select the reduced corresponding group of simulated spectra.

The unique simulated spectrum is determined from the reduced corresponding group using at least a numerical transient model.

The spectra of the reduced corresponding group are selected then compared with the experimental spectrum by implementing at least one of the following steps:

Direct difference between simulated spectra and experimental spectrum;

Comparison of the overall shape of the simulated spectra and of the experimental spectrum;

Determination of the differences between the maximum height peak positions of respectively the simulated spectra and the experimental spectrum;

Cross correlation between the simulated spectra and the experimental spectrum.

BRIEF DESCRIPTION OF THE DRAWINGS

Other characteristics and advantages of the invention will be described in the following description, by way of indication and in no way limiting, and referring to the annexed figures among which.

DETAILED DESCRIPTION

The system and the method of the invention notably find application in the estimation of both thickness and wear state of refractory material 1 of a metallurgical furnace 12, and more particularly of refractory material 1 of a specific bottom part of the blast furnace 12 containing molten metals, in which temperature is the highest.

Figure 1:
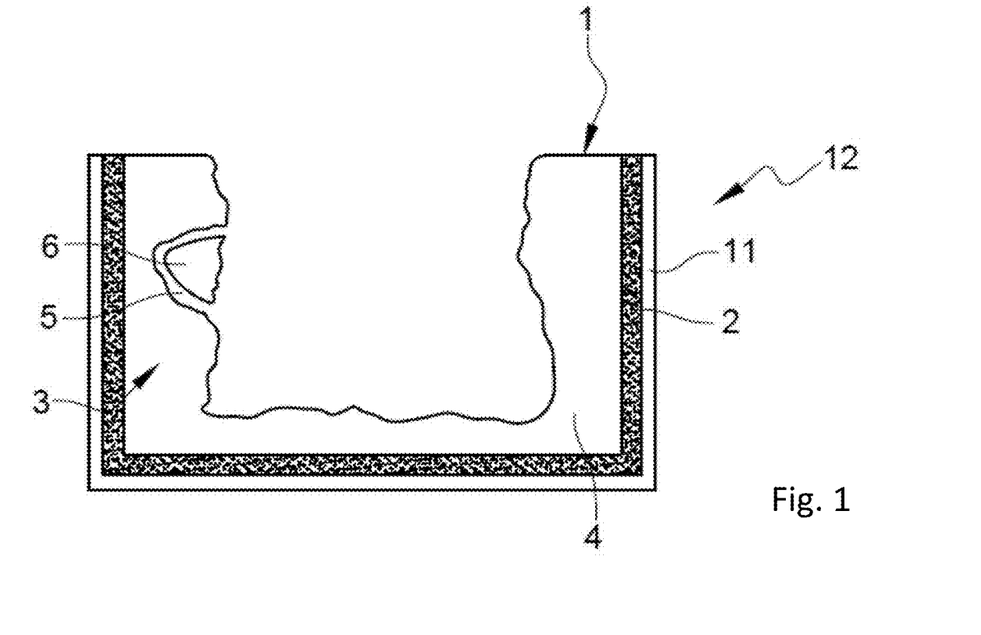
FIG. 1 represents a sectional view of a blast furnace.
Figure 2:
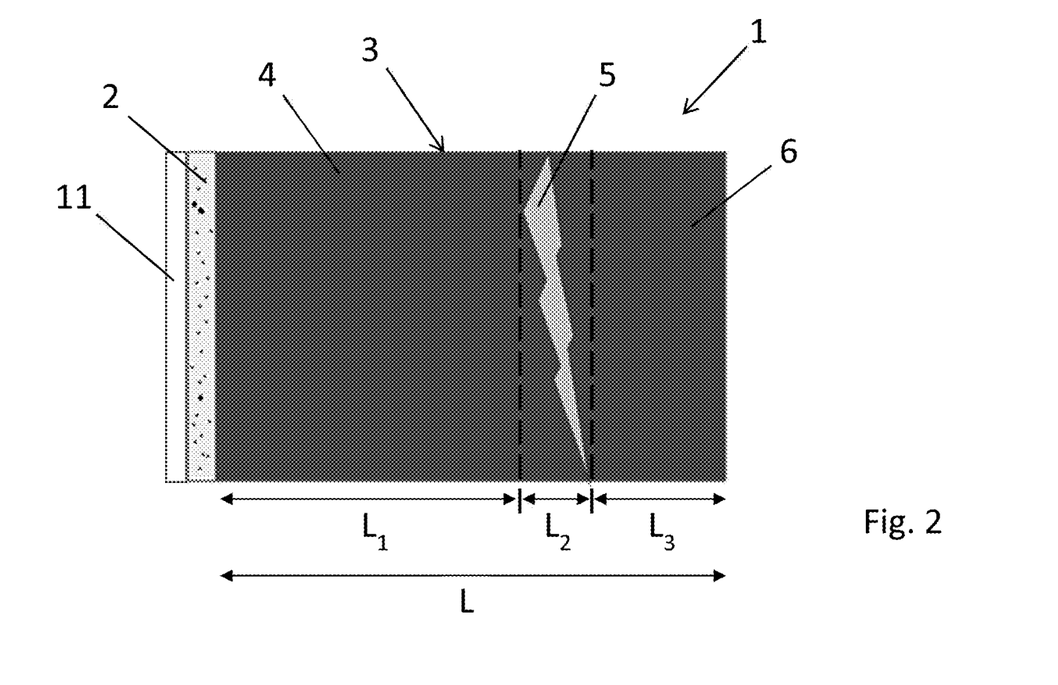
FIG. 2 represents a sectional view of refractory material of a blast furnace.

The bottom part of the blast furnace 12 comprises an outer layer 11 made of metal, typically steel. In order to thermally isolate this outer layer 11 and as depicted in FIGS. 1 and 2, the blast furnace 12 comprises a refractory material 1 whose composition is correlated with the temperature to which it is submitted.

In the bottom part of the blast furnace 12, in which temperature is over 1500 degrees Celsius, the refractory material 1 comprises a thick inner layer 3, and a thin intermediate ramming layer 2 positioned between the metal outer layer and the inner layer 3. The ramming layer 2 is about five to ten centimetres thick and is preferably made of ceramic. The inner layer 3, made of carbon, is about eighty to a hundred centimetres.

Figure 3A:
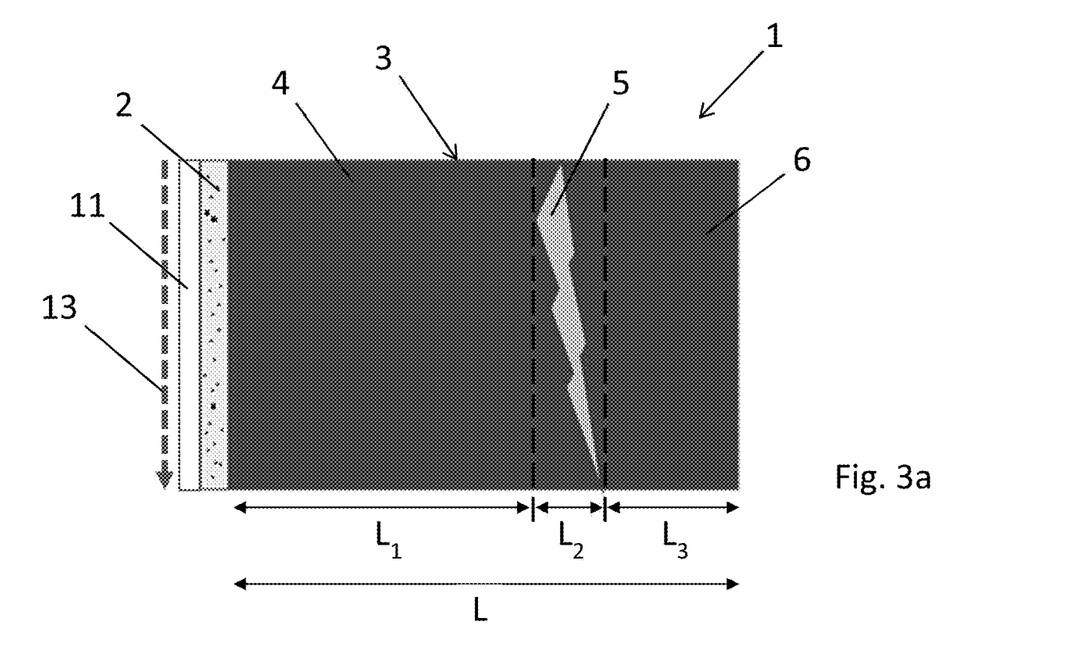
FIG. 3a represents a sectional view of a first variant of refractory material of a blast furnace comprising a cooling system.
Figure 3B:
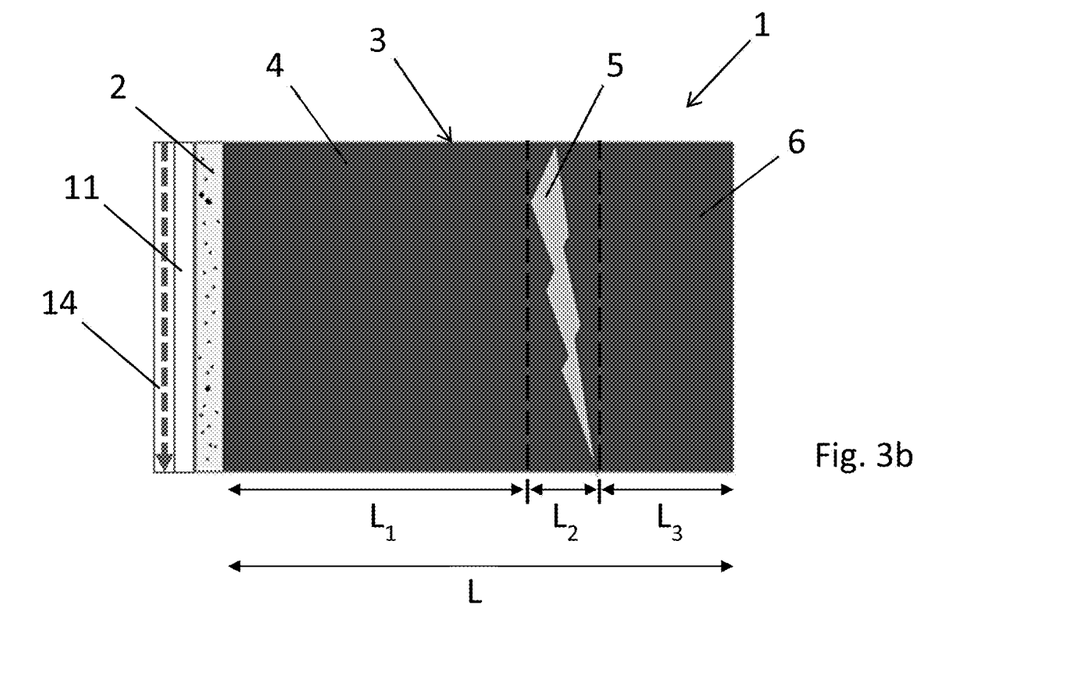
FIG. 3b represents a sectional view of a second variant of a refractory material of a blast furnace comprising a cooling system.
Figure 3C:
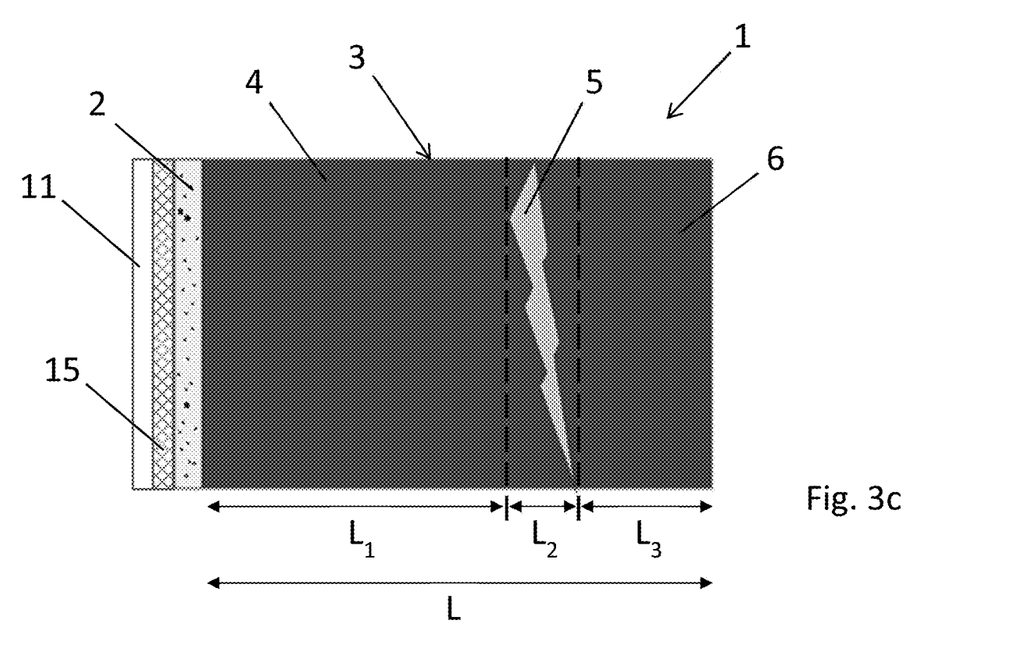
FIG. 3c represents a sectional view of a third variant of a refractory material of a blast furnace comprising a cooling system.

As depicted in FIGS. 3a to 3c, the blast furnace 12 further comprises cooling means 13, 14, 15 adapted to cool down the blast furnace 12 with an adapted coolant, for example water. These cooling means 13, 14 and [[—]] 15 are adjacent to the steel outer layer 11 of the blast furnace 12.

In a first variant depicted in FIG. 3a, the cooling means 13 comprises a spraying device adapted to spray a nebulized coolant regularly or continuously against the external face of the outer layer 11. The vaporization of the coolant on the outer layer 11 helps to cool the blast furnace 12.

In a second variant depicted in FIG. 3b, the cooling means comprises cooling channels 14 disposed against the external face of the outer layer 114. The coolant flows through these channels 14 and contributes to cool the blast furnace 12 via the outer layer 11.

In a third variant depicted in FIG. 3c, the cooling means comprises cooling staves 15 inserted between the outer layer 11 and the intermediate ramming layer 2. The coolant flows through these staves 15 and contributes to cool the blast furnace 12 via the ramming layer 2.

As depicted earlier, the objective of the system and method of the invention is to estimate, in a non-destructive manner, both state and thickness of the inner and intermediate layers 2, 3.

The state of the layer 2, 3 means the wear state of said layer 2, 3: the system and the method of the invention can detect defaults and weakness in the refractory material 1. Especially, the invention is designed to detect ramming gaps in the intermediate layer 2, and to detect position and thickness of any weakened layer 5 in the inner layer 3, said weakened layer being named brittle layer 5.

As depicted in FIG. 2, the system and method of the invention can also estimate the thickness $L_1$ of the remaining "sane" inner layer 4, that is to say the remaining carbon layer between the intermediate layer 2 and the brittle layer 5, and the thickness $L_3$ of the "damaged" inner layer 6, that is to say carbon layer beyond the brittle layer 5.

The system and method of the invention apply to any blast furnace 12 described above, whether the blast furnace 12 is equipped with cooling means 13-15 or not, and whatever the variant of cooling means 13-15.

The system of the invention will now be described.

The system comprises at least a motorized hammer, configured to hit the outer layer of the blast furnace 12. The purpose of each hit performed by the hammer is to excite the refractory material 1 of the blast furnace 12: after each hit, a mechanical shock wave, typically an acoustic shock wave, is generated and propagates through the refractory material 1. Of course, a plurality of shock waves can be generated with the hammer, since each hit generates a shock wave.

The system also comprises at least a shock wave sensor to detect the excitation of the refractory material 1 of the blast furnace 12. In other words, said shock wave sensor is made to detect at least a reflected shock wave into the refractory material 1. Since shock waves provoke a succession of compressions and dilatations in the refractory material 1, each shock wave sensor is preferably an accelerometer installed on the outer surface of the outer layer of the blast furnace 12, to be able to detect mechanical excitations of the refractory material 1.

The system comprises processing means electrically connected to the motorized hammer and to the accelerometer and are configured to record the reflected shock wave sensed by the accelerometer. This recorded signal represents displacements of the refractory material 1 versus time. The recorded signal is thus a time domain signal.

Processing means are also configured to convert the time domain signal into frequency domain data named in the following "experimental spectrum" for example via a fast Fourier transform algorithm. Thanks to this conversion, the experimental spectrum shows the propagation modes, meaning every resonant frequency correlated with the mechanical excitation of the refractory material 1. Propagation modes of the experimental spectrum are correlated with structural properties of the refractory material 1, meaning its gaps in the ramming layer 2, its total thickness L and if applied its brittle layer 5 position and thickness $L_2$.

As explained in a later section and according to the invention, the system uses the propagation modes in order to estimate both thickness L and wear state of the refractory material 1. More particularly, the processing means are configured to compare the experimental spectrum with a plurality of simulated spectrum.

Processing means of the system therefore comprise a database of simulated spectra, each simulated spectrum being a fast Fourier transform of a corresponding simulated time domain signal corresponding to a known refractory material of a blast furnace 12. In other words, each simulated spectrum is correlated with a simulated refractory material whereof ramming gaps, total thickness and brittle layer position and thickness are known.

The simulated spectra are generated using known finite element analysis software, with which a wide range of refractory material configurations are studied. The database may comprise more than 200.000 simulated spectra, corresponding to as many refractory material configurations.

According to the invention, a method for estimating both thickness L and state of refractory material 1 of blast furnace 12 is implemented by the system described above. This method will now be described.

In the first step of the method, processing means control the motorized hammer, so it can hit the surface of the outer layer of the blast furnace. At the same time, the accelerometer is activated in order to sense any excitation signal of the refractory material 1 of the blast furnace 12. The hammer thus generates a shock wave propagating through the refractory material 1.

In a second step, the accelerometer senses the reflected shock wave into the refractory material 1, said reflected shock wave being thus recorded as a time domain signal in a memory of the processing means.

In a third step, processing means converts the time signal domain into frequency domain data, in order to generate an experimental spectrum representative of the refractory material 1 structure.

In the fourth step, the processing means compare the experimental spectrum with at least a plurality of simulated spectra recorded in the database, in order to determine the best fitting simulated spectrum with the experimental spectrum. To do so, the processing means seek for representative resonant peaks in the experimental spectrum and compare them with resonant frequency peaks of the plurality of simulated spectra, such resonant peaks being the representative propagation modes. The following description will precisely describe the way the best fitting simulated spectrum can be chosen in said fourth step.

Figure 4:
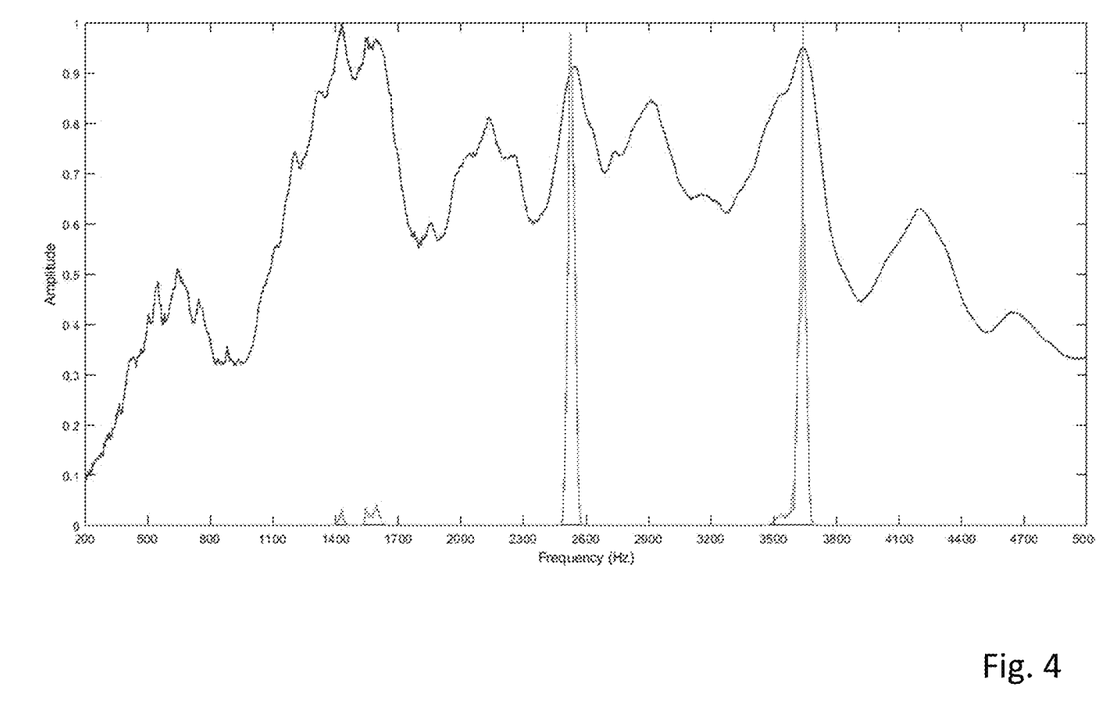
FIG. 4 represents a graph with a first curve representing arithmetically averaged experimental spectra and a second curve representing geometrically averaged experimental spectra.

Preferentially, in order to increase signal to noise ratio, those three steps are sequentially repeated in order to obtain a plurality of experimental spectra representative of the refractory material 1 structure, typically between ten and twenty experimental spectra. In order to reduce noise, this plurality of experimental spectra is arithmetically averaged following the formula $1/n\Sigma_{i=1}^{n} f_i$ where n is the number of experimental spectra and $f_i$ is the $i^{th}$ experimental spectrum. The result is depicted in FIG. 4, showing an arithmetically averaged experimental spectrum 7, which is a curve representing amplitude of the Fourier transformed experimental signal versus frequency.

The processing means then select a first set 9, 10 of representative peaks, said selection being based on peak height and/or on width. Preferentially, the processing means only select peaks with width greater than a threshold value comprised between ten and twenty hertz.

The experimental spectra are also geometrically averaged by the processing means following the formula $$\sqrt[n]{\prod_{i=1}^{n} f_i}.$$

In other words, the geometric mean is the $n^{th}$ root of the product of the n experimental spectra. The result is also depicted in FIG. 4, showing said geometrically averaged experimental spectrum 8. Thereby, parts of the experimental spectra that are often repeated are magnified in said averaged spectrum, as depicted in FIG. 4 which represents both arithmetically and geometrically averaged spectra. As a result, most representative peaks are magnified in this geometrically averaged spectrum, and the processing means thereby select a second set 9' of representative peaks. As depicted in FIG. 4, these peaks 9' are easy to choose since they clearly stand out from the rest of the geometrically averaged spectrum 8.

Arithmetic and geometric averaging are implemented by the processing means in parallel. The objective is to obtain two independent means—arithmetic mean and geometric mean—on experimental data based on those two parallel processing steps. The processing means thus select a final set of peaks that were both selected in the first set and in the second set. The peaks selected in the final set are the representative resonant frequency peaks 9, directly correlated with the propagation modes representative of the refractory material 1 of the blast furnace 12.

Once the final set of resonant peaks 9 is determined, the processing means filter at least the plurality of simulated spectra with said selected resonant peaks 9. This filtering is achieved by using a known numerical dispersion curves model in order to determine propagation modes of the simulated shock wave, then to filter them with the detected resonant frequency peaks 9, and finally to select a reduced group of simulated spectra comprising said resonant frequency peaks 9.

The processing means implement at least a known numerical transient model on the reduced group of simulated spectra, for example a finite element model, in order to determine a unique simulated spectrum from this reduced group of simulated spectra. This unique simulated spectrum is the best fitting simulated spectrum with the arithmetically averaged experimental spectrum 7. The best fitting spectrum is the one comprising the resonant peaks whose respective heights are the closest to those of the resonant peaks 9 of the arithmetically averaged experimental spectrum 7.

While applying the transient model, the processing means determine similarity parameters by implementing one or more of the following steps in order to determine the best fitting simulated spectrum from the reduced group of simulated spectra. For each implemented step, a considered similarity parameter is generated:
  i. Direct difference between simulated spectra of the final set and the arithmetically averaged experimental spectrum 7;
  ii. Comparison of the overall shape of the simulated spectra of the final set with the arithmetically averaged experimental spectrum 7;
  iii. Determination of the difference between decimated simulated spectra and decimated arithmetically averaged experimental spectrum 7; a decimated spectrum is a simplified spectrum, obtained for example by applying a lowpass filter in order to suppress selected characteristics of the original spectrum;
  iv. Determination of the differences between the maximum height peak positions of respectively the simulated spectra of the final set and the arithmetically averaged experimental spectrum 7, and/or
  v. Cross correlation between the simulated spectra of the final set and the arithmetically averaged experimental spectrum 7, by measuring the similarities between simulated spectra of the final set with the arithmetically averaged experimental spectrum 7. In other words, the more spectra are distant from each other in the frequency domain, the less the correlation value is.

To select the best fitting simulated spectrum from the reduced group, the processing means generate a table with the percentage of similarity between each simulated spectrum and the arithmetically average experimental spectrum 7. More specifically, the percentage of similarity is determined considering all simulated parameters obtained by implementing one or more of the above steps. In addition, all similarity parameters are considered with the same weight. In other words, if five similarity parameters are determined, each contributes for 20% with the selection of the best fitting simulated spectrum. With this approach, the more similar are spectra in shape, maximum position, etc . . . , the higher the percentage of similarity between these spectra is. The simulated spectrum with the highest percentage in the table is finally selected by the processing means to be the best fitting simulated spectrum.

Finally, in the fifth step of the method, the processing means select the simulated refractory material in the database correlated with the best fitting simulated spectrum. The processing means then generate a table with all characteristics of said simulated refractory material, which are highly comparable with the tested refractory material 1. This offers a very accurate non-destructive estimation of the characteristics of the tested refractory material, in particular presence or absence of ramming gaps in the intermediate layer 2, thickness L of total carbon layer 3, thickness $L_2$ and position of the brittle layer 5 if applicable, and thickness $L_1$ of the "sane" carbon layer 4 between the brittle layer 5 and the ramming intermediate layer 2. Moreover, with the method and system of the invention, the estimation is accurate whatever the configuration of the metallurgical furnace, notably position and kind of cooling means such as the ones described in FIGS. 3a to 3c.

What is claimed is:
1. A system for estimating both thickness and wear state of a refractory material of a metallurgical furnace, the system comprising at least:
  a shock wave generator configured to generate at least one shock wave propagating into the refractory material;
  a shock wave sensor configured to sense at least one reflected shock wave into the refractory material;
  a processor including a database of simulated frequency domain data named simulated spectra representing simulated shock waves reflected in simulated refractory materials of known state and thickness, each simulated spectrum being correlated with both known state and thickness data of the considered simulated refractory material, wherein the processor is configured:
    to record the reflected shock wave as a time domain signal, and to convert the time domain signal into frequency domain data so as to define experimental spectrum, and
    to compare the experimental spectrum with a plurality of simulated spectra from the database, to determine a best fitting simulated spectrum with the experimental spectrum and to estimate thickness and state of the refractory material of the furnace using known state and thickness data correlated with the best fitting simulated spectrum.

2. The system as recited in claim 1 wherein the processor is configured to sequentially:
  determine resonant frequency peaks position in the frequency domain data;
  filter the simulated spectra from the database with the resonant frequency peaks, and select a reduced corresponding group of simulated spectra comprising the resonant frequency peaks; and
  determine a unique simulated spectrum from the reduced corresponding group, whose resonant frequency peaks are the closest in height to resonant frequency peaks of the experimental spectrum, the unique simulated spectrum being the best fitting simulated spectrum.

3. The system as recited in claim 1 wherein the shock wave generator includes an instrumented hammer configured to hit the metallurgical furnace wall in order to generate at least an acoustic shock wave propagating and reflecting into the refractory material.

4. The system as recited in claim 1 wherein the shock wave sensor includes at least an accelerometer configured to measure the mechanical reaction of the refractory material caused by the reflection of the generated shock wave.

5. A method for estimating both thickness and wear state of the refractory material of the metallurgical furnace with the system as recited in claim 1, the method comprising at least the following steps:
   generating at least the shock wave that propagates into the refractory material;
   sensing at least the reflected shock wave into the refractory material;
   recording the reflected shock wave as the time domain signal;
   converting the time domain signal into frequency domain data so as to define experimental spectrum;
   comparing the experimental spectrum with at least the plurality of simulated spectra from the database, each simulated spectrum being correlated with both known state and thickness data of the considered refractory material;
   determining the best fitting simulated spectrum with the experimental spectrum, and
   estimating thickness and state of the refractory material of the furnace using known state and thickness data correlated with the best fitting simulated spectrum.

6. The method as recited in claim 5 wherein the comparing and determining steps are implemented by sequentially:
   determining resonant frequency peaks position in the experimental spectrum;
   filtering the simulated spectra from the database with the resonant frequency peaks detected, and selecting a reduced corresponding group of simulated spectra including the resonant frequency peaks; and
   determining a unique simulated spectrum from the reduced corresponding group, whose resonant frequency peaks are the closest in height to resonant frequency peaks of the experimental spectrum, the unique spectrum being the best fitting simulated spectrum.

7. The method as recited in claim 6 wherein the determination of the resonant frequency peaks position in the experimental spectrum is implemented following the steps of:
   arithmetically averaging the experimental spectra and selecting a first set of representative peaks;
   geometrically averaging the experimental spectra and selecting a second set of representative peaks; and
   selecting a final set of peaks selected both in the first set and the second set, the final set of peaks being the resonant frequency peaks.

8. The method as recited in claim 7 wherein the peaks of the first set are selected if their width is greater than a threshold value of between ten and twenty hertz.

9. The method as recited in claim 7 wherein the simulated spectra from the database are filtered with the resonant frequency peaks detected using at least a numerical dispersion curves model in order to determine propagation modes of the simulated shock waves, to filter them with the resonant frequency peaks detected, and to select the reduced corresponding group of simulated spectra.

10. The method as recited in claim 9 wherein the spectra of the reduced corresponding group are selected then compared with the experimental spectrum by implementing at least one of the following steps:
    detect a difference between simulated spectra and experimental spectrum;
    comparison of the overall shape of the simulated spectra and of the experimental spectrum;
    determination of the differences between the maximum height peak positions of respectively the simulated spectra and the experimental spectrum; and
    cross correlation between the simulated spectra and the experimental spectrum.

11. The method as recited in claim 7 wherein the unique simulated spectrum is determined from the reduced corresponding group using at least a numerical transient model.

12. The method as recited in claim 11 wherein the spectra of the reduced corresponding group are selected then compared with the experimental spectrum by implementing at least one of the following steps:
    direct difference between simulated spectra and experimental spectrum;
    comparison of the overall shape of the simulated spectra and of the experimental spectrum;
    determination of the differences between the maximum height peak positions of respectively the simulated spectra and the experimental spectrum; and
    cross correlation between the simulated spectra and the experimental spectrum.

13. The method as recited in claim 5 wherein the estimating step is implemented by at least estimating a total thickness of the refractory material and a position and thickness of at least a layer in which the refractory is weakened by anomalies, the layer being defined as a brittle layer.

14. The method as recited in claim 5 wherein a plurality of shock waves are generated, a plurality of reflected shock waves are sensed and recorded as time domain signals, and converted into frequency domain signals.

* * * * *